US008929889B1

(12) United States Patent
Prock et al.

(10) Patent No.: US 8,929,889 B1
(45) Date of Patent: Jan. 6, 2015

(54) HANDLING OF FREQUENCY BANDS IN NEIGHBOR LISTS IN WIRELESS COMMUNICATION DEVICES

(71) Applicant: Sprint Communications Company L.P., Overland Park, KS (US)

(72) Inventors: John W. Prock, Peculiar, MO (US); Patrick William Himmelberg, Overland Park, KS (US); Siddharth Oroskar, Overland Park, KS (US); Lawrence D. Hafner, Jr., Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 28 days.

(21) Appl. No.: 13/903,085

(22) Filed: May 28, 2013

(51) Int. Cl.

| | |
|---|---|
| ***H04W 4/00*** | (2009.01) |
| ***H04W 48/16*** | (2009.01) |
| *H04W 88/06* | (2009.01) |
| *H04W 28/04* | (2009.01) |

(52) U.S. Cl.
CPC .............. *H04W 48/16* (2013.01); *H04W 88/06* (2013.01); *H04W 28/04* (2013.01)
USPC ............. 455/434; 455/446; 455/552.1; 4/328

(58) Field of Classification Search
CPC ..... H04W 48/16; H04W 16/18; H04W 88/06; H04W 28/04
USPC ........................ 455/434, 446, 552.1; 370/328
See application file for complete search history.

(56) References Cited

U.S. PATENT DOCUMENTS

| | | | | |
|---|---|---|---|---|
| 7,127,212 | B2 * | 10/2006 | Fattouch | 455/63.1 |
| 7,215,956 | B2 | 5/2007 | Liu et al. | |
| 7,627,326 | B1 * | 12/2009 | Miller, II | 455/454 |
| 8,121,596 | B1 | 2/2012 | Shetty et al. | |
| 8,374,100 | B2 * | 2/2013 | Stacey et al. | 370/252 |
| 8,750,872 | B2 * | 6/2014 | Kim | 455/435.2 |
| 8,761,689 | B2 * | 6/2014 | Smadi | 455/88 |
| 2003/0078051 | A1 * | 4/2003 | Fattouch | 455/452 |
| 2008/0122584 | A1 * | 5/2008 | Itasaki et al. | 340/10.51 |
| 2008/0146232 | A1 | 6/2008 | Knisely | |
| 2010/0184429 | A1 * | 7/2010 | Tod et al. | 455/434 |
| 2011/0064048 | A1 * | 3/2011 | Oguchi | 370/331 |
| 2012/0276907 | A1 * | 11/2012 | Tod et al. | 455/437 |
| 2013/0089039 | A1 * | 4/2013 | Vashi et al. | 370/329 |

* cited by examiner

*Primary Examiner* — Danh Le

(57) ABSTRACT

Systems, methods, and software for handling of frequency bands in neighbor lists in wireless communication devices are provided herein. In one example, a method of operating a wireless communication device is presented which includes scanning a first frequency band of a source sector based on a neighbor list, and dropping the first frequency band of the source sector from an access list based on a first drop threshold included in the neighbor list. The method also includes scanning a second frequency band of the source sector and the second frequency band of a target sector based on the neighbor list, and adding the second frequency band of the source sector and the second frequency band of the target sector to the access list based on second and third add thresholds included in the neighbor list.

20 Claims, 6 Drawing Sheets

201 RECEIVE A NEIGHBOR LIST TRANSFERRED BY A SOURCE WIRELESS ACCESS NODE, THE NEIGHBOR LIST INDICATING A FIRST DROP THRESHOLD AND A FIRST ADD THRESHOLD FOR A FIRST FREQUENCY BAND OF THE SOURCE SECTOR, A SECOND DROP THRESHOLD AND A SECOND ADD THRESHOLD FOR A SECOND FREQUENCY BAND OF THE SOURCE SECTOR, AND A THIRD DROP THRESHOLD AND A THIRD ADD THRESHOLD FOR THE SECOND FREQUENCY BAND OF A TARGET SECTOR, WHERE THE FIRST DROP THRESHOLD IS LOWER THAN THE SECOND DROP THRESHOLD AND THE THIRD DROP THRESHOLD, AND WHERE THE FIRST ADD THRESHOLD IS HIGHER THAN THE SECOND ADD THRESHOLD AND THE THIRD ADD THRESHOLD

202 SCAN THE FIRST FREQUENCY BAND OF THE SOURCE SECTOR BASED ON THE NEIGHBOR LIST

203 DROP THE FIRST FREQUENCY BAND OF THE SOURCE SECTOR FROM THE ACCESS LIST BASED ON THE FIRST DROP THRESHOLD

204 SCAN THE SECOND FREQUENCY BAND OF THE SOURCE SECTOR AND THE SECOND FREQUENCY BAND OF THE TARGET SECTOR BASED ON THE NEIGHBOR LIST

205 ADD THE SECOND FREQUENCY BAND OF THE SOURCE SECTOR AND THE SECOND FREQUENCY BAND OF THE TARGET SECTOR TO THE ACCESS LIST BASED ON THE SECOND AND THIRD ADD THRESHOLDS

| ENTRY | SECTOR ID | FREQUENCY BAND | ADD THRESH. | DROP THRESH. |
|---|---|---|---|---|
| 1 | 330 | 1900 MHz | $T_{ADD1}$ | $T_{DROP1}$ |
| 2 | 330 | 800 MHz | $T_{ADD2}$ | $T_{DROP2}$ |
| 3 | 331 | 1900 MHz | $T_{ADD3}$ | $T_{DROP3}$ |
| 4 | 331 | 800 MHz | $T_{ADD4}$ | $T_{DROP4}$ |
| 5 | 332 | 1900 MHz | $T_{ADD5}$ | $T_{DROP5}$ |
| 6 | 332 | 800 MHz | $T_{ADD6}$ | $T_{DROP6}$ |
| 7 | 333 | 800 MHz | $T_{ADD7}$ | $T_{DROP7}$ |
| 8 | 334 | 800 MHz | $T_{ADD8}$ | $T_{DROP8}$ |
| 9 | 335 | 800 MHz | $T_{ADD9}$ | $T_{DROP9}$ |

HANDLING OF FREQUENCY BANDS IN NEIGHBOR LISTS IN WIRELESS COMMUNICATION DEVICES

TECHNICAL FIELD

Aspects of the disclosure are related to the field of communications, and in particular, handling of frequency bands in neighbor lists in wireless communication devices.

TECHNICAL BACKGROUND

Wireless communication systems, such as cellular voice and data networks, typically include multiple wireless access nodes spread over a geographic area through which wireless communication devices can register and receive wireless access to communication services. In many examples, the wireless communication devices are mobile, and can move between wireless coverage areas, such as sectors, of the wireless access nodes.

The wireless coverage areas can be associated with more than one frequency band, depending upon the particular transceiver equipment associated with each wireless access node. Some wireless coverage areas might support a first set of frequency bands while other coverage areas might support a different set of frequency bands. For example, a first band class representing a 900 megahertz (MHz) frequency band might be supported at a first sector of a wireless access node, while the first band class and a second band class representing an 1800 MHz frequency band might be supported at another sector of a wireless access node.

Wireless communication devices typically reference a preferred roaming list (PRL) or similar data structure to determine allowed frequency bands and service providers while moving among these various wireless coverage areas. Furthermore, a neighbor list can be distributed from a particular wireless access node to a wireless communication device to indicate which wireless access nodes of a similar frequency band are proximate to the wireless access node distributing the neighbor list. However, when proximate wireless access nodes include different frequency bands, the wireless communication devices typically reference a PRL to establish further wireless access.

Overview

Systems, methods, and software for handling frequency bands in neighbor lists in wireless communication devices are provided herein. In one example, a method of operating a wireless communication device is presented. The method includes a wireless communication device that maintains an access list of wireless network information to access wireless communication services, the wireless communication device served by a source wireless access node in a source sector over a first frequency band, where the source wireless access node and the source sector also use a second frequency band, and where a target wireless access node has a target sector that uses the second frequency band. The method includes, in the wireless communication device, receiving a neighbor list transferred by the source wireless access node, the neighbor list indicating a first drop threshold and a first add threshold for the first frequency band of the source sector, a second drop threshold and a second add threshold for the second frequency band of the source sector, and a third drop threshold and a third add threshold for the second frequency band of the target sector, where the first drop threshold is lower than the second drop threshold and the third drop threshold, and where the first add threshold is higher than the second add threshold and the third add threshold. The method includes, in the wireless communication device, scanning the first frequency band of the source sector based on the neighbor list, and in response, dropping the first frequency band of the source sector from the access list based on the first drop threshold. The method includes, in the wireless communication device, scanning the second frequency band of the source sector and the second frequency band of the target sector based on the neighbor list, and in response, adding the second frequency band of the source sector and the second frequency band of the target sector to the access list based on the second and third add thresholds.

In another example, a wireless communication device is presented. The wireless communication device includes a processing portion configured to maintain an access list of wireless network information to access wireless communication services, the wireless communication device served by a source wireless access node in a source sector over a first frequency band, where the source wireless access node and the source sector also use a second frequency band, and where a target wireless access node has a target sector that uses the second frequency band. The wireless communication device includes a transceiver portion configured to receive a neighbor list transferred by the source wireless access node, the neighbor list indicating a first drop threshold and a first add threshold for the first frequency band of the source sector, a second drop threshold and a second add threshold for the second frequency band of the source sector, and a third drop threshold and a third add threshold for the second frequency band of the target sector, where the first drop threshold is lower than the second drop threshold and the third drop threshold, and where the first add threshold is higher than the second add threshold and the third add threshold. The transceiver portion is configured to scan the first frequency band of the source sector based on the neighbor list, and in response, the processing portion is configured to drop the first frequency band of the source sector from the access list based on the first drop threshold. The transceiver portion is configured to scan the second frequency band of the source sector and the second frequency band of the target sector based on the neighbor list, and in response, the processing portion is configured to add the second frequency band of the source sector and the second frequency band of the target sector to the access list based on the second and third add thresholds.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
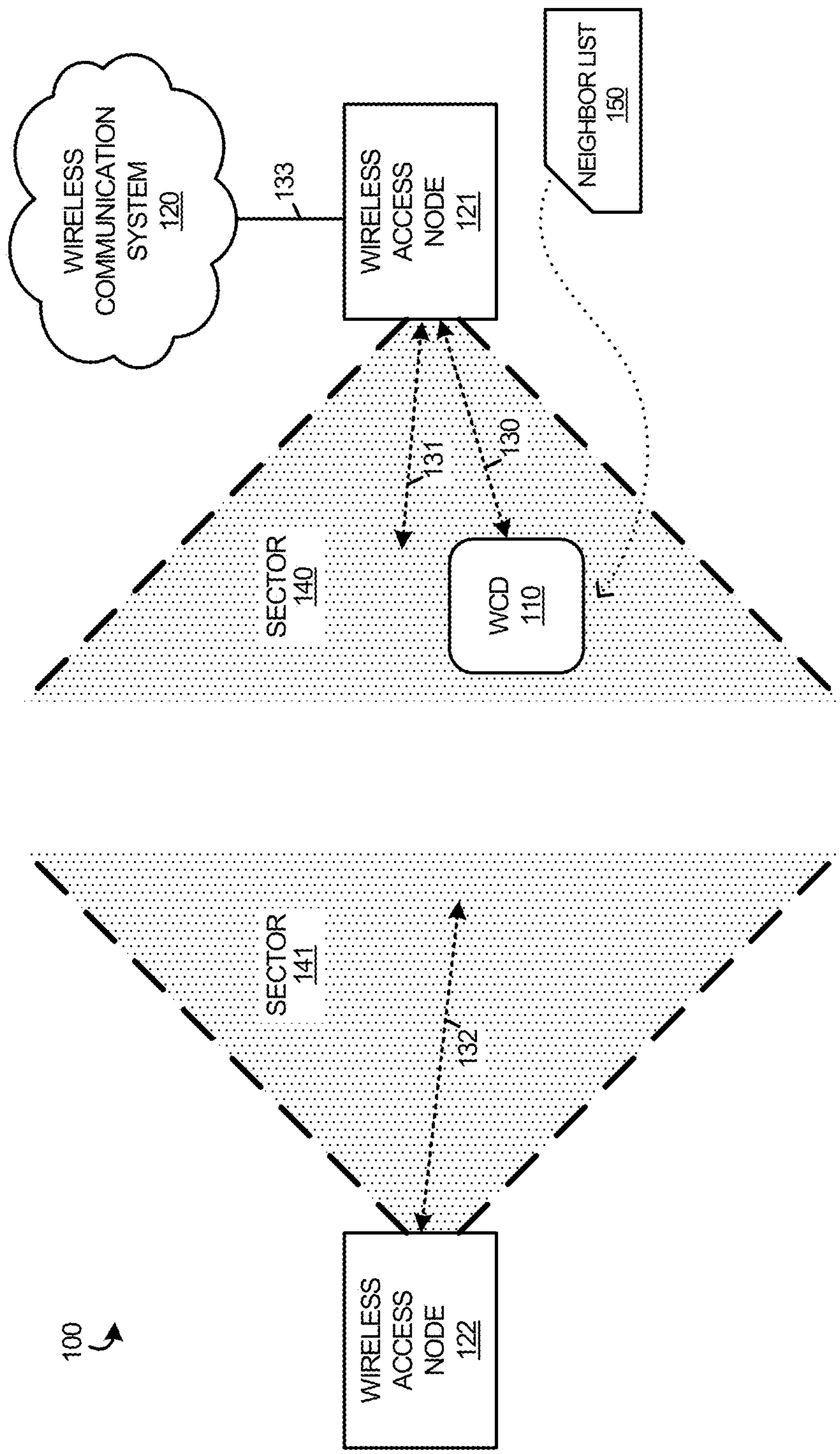
FIG. 1 is a system diagram illustrating a communication system.

FIG. 1 is a system diagram illustrating communication system 100. Communication system 100 includes wireless communication device (WCD) 110, wireless communication system 120, and wireless access nodes 121-122. WCD 110 and wireless access node 121 can communicate over any of wireless links 130-131. WCD 110 and wireless access node 122 can communicate over wireless link 132. Wireless communication system 120 and wireless access node 121 communicate over link 133. Wireless communication system 120 and wireless access node 122 can also communicate over a communication link, but FIG. 1 omits this link for clarity.

In operation, WCD 110 receives wireless access to communication services from a wireless access node. The communication services can include voice calls, text messaging, data exchange, multimedia streaming, and the like. The wireless access node, such as wireless access node 121 provides one or more wireless links in a sector of wireless coverage, such as sector 140. Other sectors of wireless coverage can be associated with other wireless access nodes, such as sector 141 associated with wireless access node 122. WCD 110 can receive information related to the wireless access from a wireless access node, such as beacon signals, channel information, frequency information, overhead signaling, and the like. For example, neighbor list 150 can be transferred to WCD 110 by wireless access node 121. WCD 110 can also move among the various coverage areas associated with communication system 110, and receive wireless access over any of wireless links 130-132.

WCD 110 maintains an access list of wireless network information to access wireless communication services, such as the communication services of communication system 100 or wireless communication system 120. In FIG. 1, WCD 110 is initially served by a source wireless access node, namely wireless access node 121, in source sector 140 over a first frequency band of wireless link 130. WCD 110 can also be served by a second frequency band of wireless link 131 in source sector 140. Target wireless access node 122 uses the second frequency band of wireless link 132 in target sector 141. The first frequency band can comprise a first frequency spectrum or portion of a frequency spectrum, such as that described for a first band class (BC) for wireless spectrum. The second frequency band can comprise a second frequency spectrum or portion of a frequency spectrum, such as that described for a second BC for wireless spectrum. In this example, the first frequency band is a different frequency band than the second frequency band, and the second frequency band of the source sector is the same frequency band as the second frequency band of the target sector.

Figure 2:
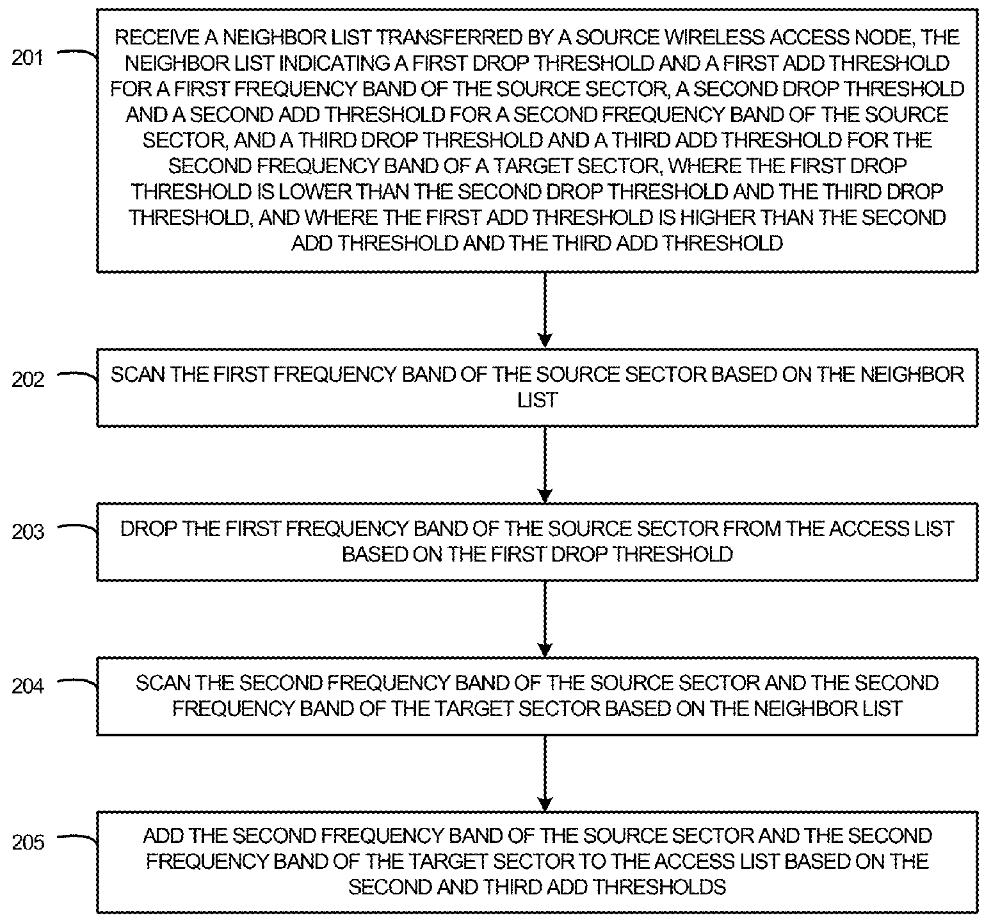
FIG. 2 is a flow diagram illustrating a method of operation of a wireless communication device.

FIG. 2 is a flow diagram illustrating a method of operating communication system 100. The operations of FIG. 2 are referenced below parenthetically. In FIG. 2, WCD 110 receives (201) neighbor list 150 transferred by source wireless access node 121, the neighbor list indicating a first drop threshold and a first add threshold for a first frequency band of source sector 140, a second drop threshold and a second add threshold for a second frequency band of source sector 140, and a third drop threshold and a third add threshold for the second frequency band of target sector 141, where the first drop threshold is lower than the second drop threshold and the third drop threshold, and where the first add threshold is higher than the second add threshold and the third add threshold. In this example, the first frequency band of sector 140 is associated with wireless link 130, the second frequency band of sector 140 is associated with wireless link 131, and the second frequency band of sector 141 is associated with wireless link 132. Neighbor list 150 is received over wireless link 130 from wireless access node 121.

A neighbor list typically includes a listing of various wireless links for wireless access nodes or sectors with associated access frequency or access channel information such as pseudorandom code information for the particular wireless link. The neighbor list can include information on radio access technology, band classes, frequencies, bandwidths, timing offsets, coding information, search window information, or other wireless access information for a set of nearby wireless access nodes. In this example, neighbor list 150 includes additional information for each wireless link or sector. Entries for more than one frequency band are included in neighbor list 150, specifically, the first frequency band and the second frequency band. Add/drop thresholds are also included for each entry in neighbor list 150.

Thus, neighbor list 150 can include several entries. An entry can include identifiers for a wireless access node or sector, an access frequency or frequency band, and add/drop thresholds for that entry. In this example, a least three entries are included: 1) an identifier for sector 140, and indications of a first frequency band, a first drop threshold, and a first add threshold; 2) an identifier for sector 140, and indications of a second frequency band, a second drop threshold, and a second add threshold; and 3) an identifier for sector 141, and indications of the second frequency band, a third drop threshold, and third add threshold. More entries can be included for further sectors, wireless links, and the like. Neighbor list 150 is also predetermined and stored in a wireless access node, such as in wireless access node 121.

WCD 110 scans (202) the first frequency band of source sector 140 based on neighbor list 150. As discussed above, neighbor list 150 includes entries for various frequency bands for various sectors, which also include associated thresholds. In operation 202, the drop threshold of the first frequency band of sector 140 is applied to communications over the first frequency band of sector 140. The drop threshold can include a threshold indicating a signal strength, signal to noise ratio, signal to interference ratio, energy to interference (E/I) ratio, or other indicator of signal strength or signal quality for communications over the first frequency band of sector 140 as monitored by WCD 110. In this example, the first frequency band of sector 140 corresponds to wireless link 130, and thus WCD 110 can monitor communications of wireless link 130 to determine the signal quality.

WCD 110 drops (203) first frequency band of the source sector 140 from the access list based on the first drop threshold. Once the signal quality monitored by WCD 110 drops below the first drop threshold, then WCD 110 can drop the first frequency band of source sector 140 from the access list. The access list can comprise a listing of current wireless links or frequency bands of a particular sector that WCD 110 is currently using for communications. The access list can comprise an active set in some examples, which might include indicators for wireless links that WCD 110 is in a soft handoff with. Once the signal quality of the first frequency band of source sector 140 drops below the first drop threshold indicated in neighbor list 150, then WCD 110 drops the first frequency band of source sector 140 from the access list.

WCD 110 scans (203) the second frequency band of source sector and the second frequency band of the target sector based on the neighbor list. At least two additional entries are included in neighbor list 150 in this example. Specifically, entry (2) and (3) discussed above. WCD 110 scans or monitors for wireless communications over the second frequency band from source sector 140 and target sector 141. In this example, wireless link 131 is associated with the second frequency band for source sector 140, and wireless link 132 is associated with the second frequency band for target sector 141. WCD 110 can monitor for signal quality of communications such as beacon or pilot signals broadcast over the second frequency band for each of sectors 140-141.

WCD 110 adds (204) the second frequency band of source sector 140 and the second frequency band of target sector 141 to the access list based on the second and third add thresholds. As discussed above, neighbor list 150 includes entries for various frequency bands for various sectors, which also include associated thresholds. In operation 204, the add threshold of the second frequency band of sector 140 is applied to communications over the second frequency band of sector 140, and the add threshold of the second frequency band of sector 141 is applied to communications over the second frequency band of sector 141. The add threshold can include a threshold indicating a signal strength, signal to noise ratio, signal to interference ratio, energy to interference (E/I) ratio, or other indicator of signal strength or signal quality for communications over the second frequency band of sectors 140-141 as monitored by WCD 110.

Once the signal quality monitored by WCD 110 for the second frequency band rises above or exceeds the second or third add thresholds, then WCD 110 can add the associated second frequency band or bands into the access list. The access list can comprise a listing of current wireless links or frequency bands of a particular sector that WCD 110 is currently using for communications. The access list can comprise an active set in some examples, which might include indicators for wireless links that WCD 110 is in a soft handoff with.

Once the signal quality of the second frequency band of source sector 140 exceeds the second add threshold indicated in neighbor list 150, then WCD 110 adds the second frequency band of source sector 140 into the access list. Likewise, once the signal quality of the third frequency band of target sector 141 exceeds the third add threshold indicated in neighbor list 150, then WCD 110 adds the second frequency band of target sector 141 into the access list. Both the second frequency band of sector 140 and the second frequency band of sector 141 can be added to the access list, or only one of the frequency bands, based on at least the signal quality and the thresholds in neighbor list 150. Once the associated second frequency band or bands have been added to the access list, then WCD 110 can proceed to communicate over the associated wireless link, such as ones of wireless links 131-132. In this manner, falling back to or referencing of a preferred roaming list (PRL) can be avoided by WCD 310, since different frequency bands and associated add/drop thresholds are provided in the neighbor list.

Figure 3:
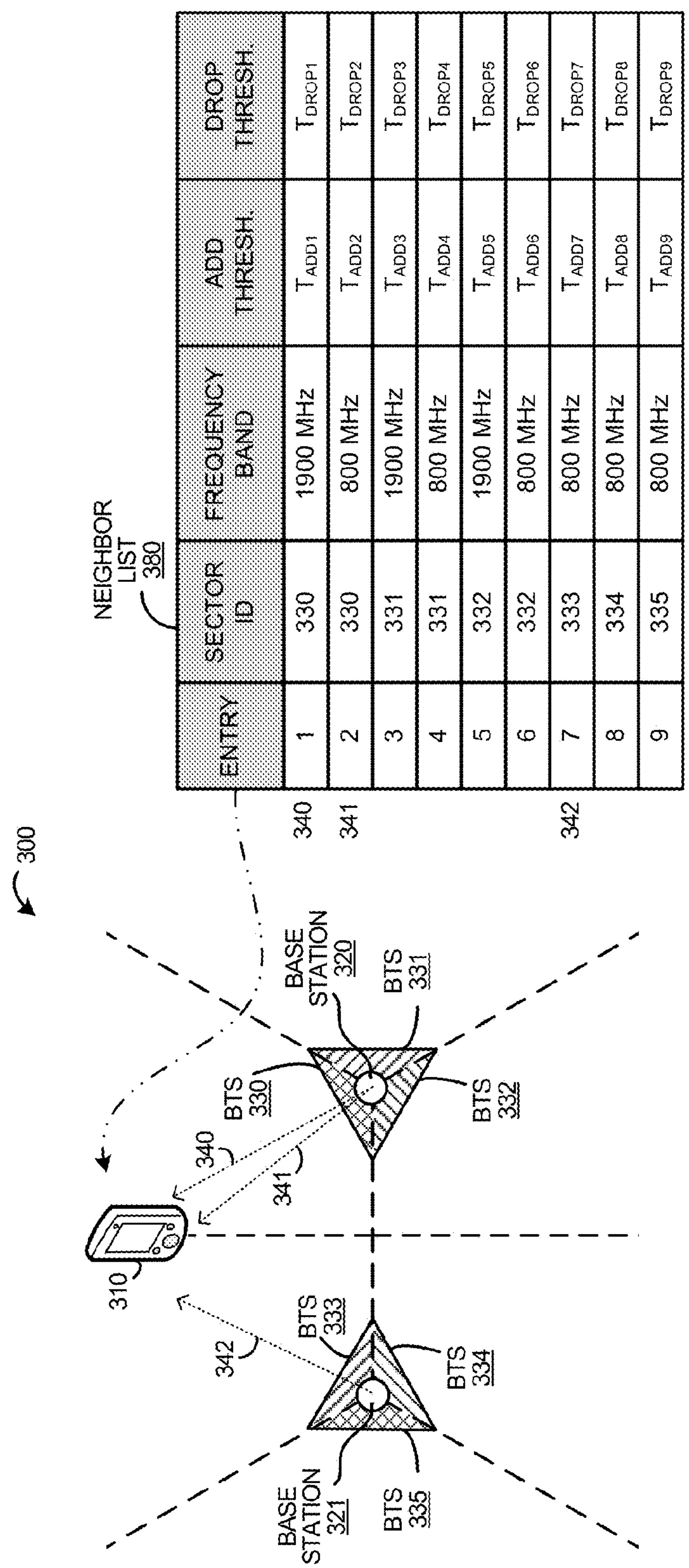
FIG. 3 is a system diagram illustrating a communication system.

FIG. 3 is a system diagram illustrating communication system 300. Communication system 300 includes user device 310, base stations 320-321, and base transceiver stations (BTS) 330-335. BTS 330-332 are associated with base station 320, while BTS 333-335 are associated with base station 321. User device 310 can communicate with any of BTS 330-335 over wireless links, such as those shown for wireless links 340-342 in FIG. 3. Each BTS in FIG. 3 corresponds to a sector of wireless coverage, and numerical references for each BTS will be used interchangeably as sector identifiers.

FIG. 3 also includes neighbor list 380. Neighbor list 380 includes a first column indicating an entry index, a second column indicating a sector identifier, a third column indicating a frequency band, a fourth column indicating an add threshold, and a fifth column indicating a drop threshold. Entries listed in rows of neighbor list 380 each include information as indicated for establishing a particular wireless access link, such as entry '1' for wireless link 340, entry '2' for wireless link 341, and entry '7' for wireless link 342.

In this example, user device 310 can comprise a smart phone or feature phone communication device, which includes one or more transceiver portions for communicating over one or more wireless links of different frequency bands. Base stations 320-321 each include processing equipment, routing equipment, physical structures, and can also include transceiver equipment, antenna equipment, and other equipment as indicated in BTS 330-335. BTS 330-335 each include transceiver and antenna equipment for exchanging wireless communications with user devices in a particular sector of wireless coverage, as indicated by the dashed lines delineating sectors in FIG. 3 for each of BTS 330-335. Further equipment, networks, and systems can be communicatively coupled to BTS 330-335 or base stations 320-321, such as equipment, networks, and systems of cellular voice and data communication systems, but are omitted in FIG. 3 for clarity.

Figure 4:
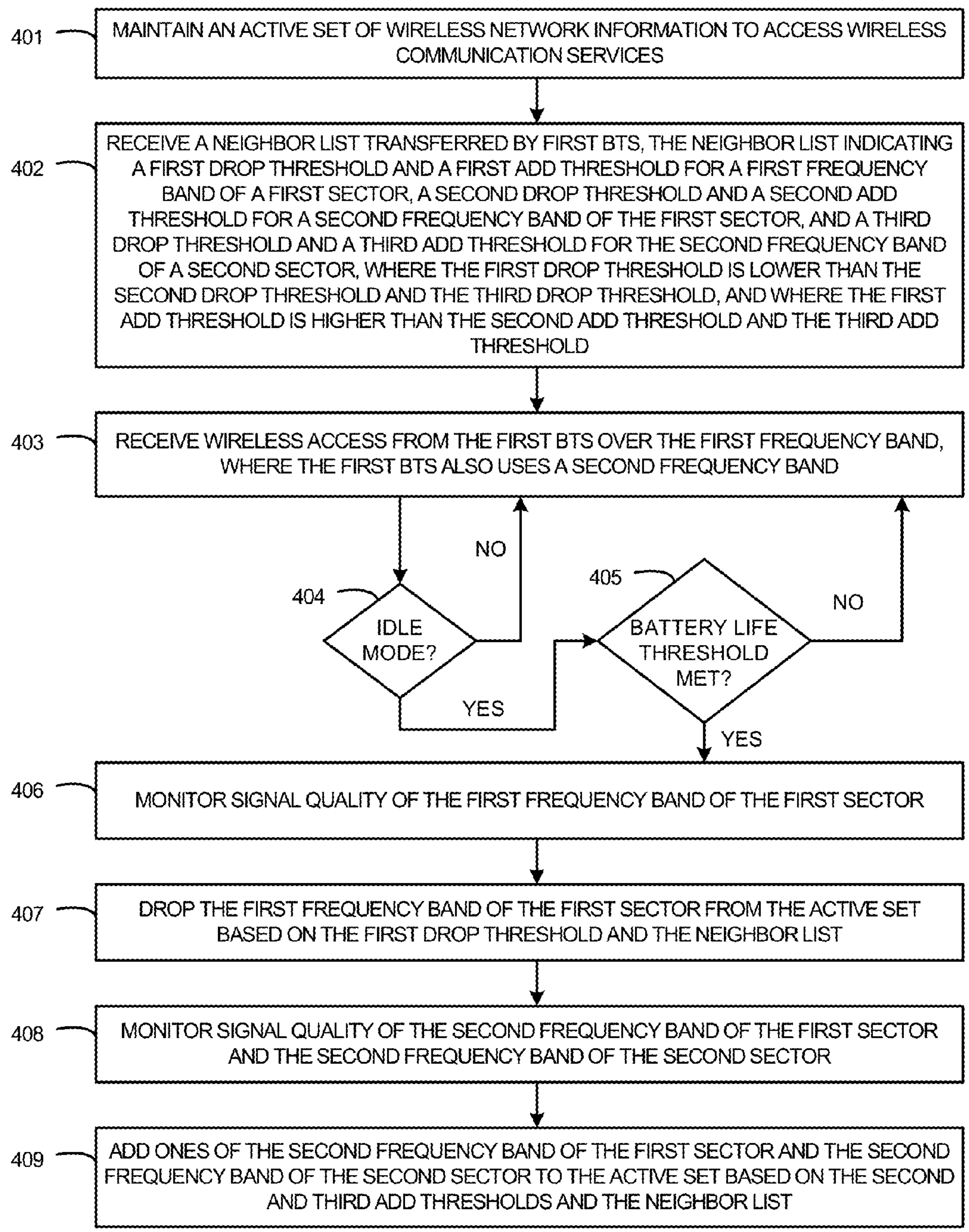
FIG. 4 is a flow diagram illustrating a method of operation of a wireless communication device.

FIG. 4 is a flow diagram illustrating a method of operation of user device 310. The operations of FIG. 4 are referenced below parenthetically. In FIG. 4, user device 310 maintains (401) an active set of wireless network information to access wireless communication services. The active set in this example includes a list of access frequencies and other information for wireless links with ones of BTS 330-335 that user device 310 is in communication over, such as during soft handoff or during an active communication session. Entries in the active set can be added to or removed based on the neighbor list, such as neighbor list 380 or based on other lists, such as candidate lists.

User device 410 receives (402) neighbor list 380 transferred by BTS 330, with neighbor list 380 indicating threshold $T_{ADD1}$ and threshold $T_{DROP1}$ for a first frequency band of a sector 330, threshold $T_{ADD2}$ and threshold $T_{DROP2}$ for a second frequency band of sector 330, and threshold $T_{ADD7}$ and threshold $T_{DROP7}$ for the second frequency band of sector 333, among other sectors, where the $T_{DROP1}$ threshold is lower than at least the $T_{DROP2}$ threshold and the $T_{DROP7}$ threshold, and where the $T_{ADD1}$ threshold is higher than the $T_{ADD2}$ threshold and the $T_{ADD7}$ threshold. Although exact values for each threshold are not given in FIG. 3, any appropriate values can be employed. The add/drop thresholds can each include a threshold indicating a signal strength, signal to noise ratio, signal to interference ratio, energy to interference (E/I) ratio, or other indicator of signal strength or signal quality for communications over the associated frequency band of the associated sector.

In this example, neighbor list 380 includes nine entries, with entry '1' corresponding to a 1900 MHz frequency band of BTS 330, entry '2' corresponding to an 800 MHz frequency band of BTS 330, and entry '3' corresponding to an 800 MHz frequency band of BTS 333. Initially, user device 310 communicates over wireless link 340, which uses the 1900 MHz frequency band, and receives neighbor list 380 over wireless link 340, such as during a registration process or later overhead/control information exchange with BTS 330. As seen in neighbor list 380, BTS 330-332 of base station 320 provide wireless access over two frequency bands, namely the 800 MHz and 1900 MHz bands, while BTS 333-335 of base station 321 only provides wireless access over one frequency band, namely the 800 MHz band. Neighbor list 380 can include further information on radio access technology, band classes, access frequencies, bandwidths, timing offsets, coding information, search window information, or other wireless access information for a set of nearby sectors or BTS equipment. The entries for the various frequency bands provided in neighbor list 380 are for a home or native communication network of user device 310 provided by a home service provider, and do not indicate roaming or non-native networks or frequency bands provided by non-home service providers.

Also in this example, neighbor list 380 indicates the $T_{DROP1}$ threshold is lower than at least the $T_{DROP2}$ threshold and the $T_{DROP7}$ threshold, and neighbor list 380 indicates the $T_{ADD1}$ threshold is higher than the $T_{ADD2}$ threshold and the $T_{ADD7}$ threshold. In further examples, the $T_{DROP2}$ threshold is also lower than the $T_{DROP7}$ threshold, and the $T_{ADD2}$ threshold is also higher than the $T_{ADD7}$ threshold. A lower threshold can be indicated by a lower or poorer signal quality, such as a lower E/I ratio, while a higher threshold can be indicated by a higher signal quality, such as a higher E/I ratio.

User device 310 receives (403) wireless access from BTS 330 over the 1900 MHz frequency band, where BTS 330 also can use the 800 MHz frequency band. As mentioned above, initially user device 310 communicates over wireless link 340 with BTS 330. Communication sessions can be conducted over wireless link 340, such as voice calls, text messaging, data transfers, multimedia streaming, and the like.

User device 310 determines if user device 310 is in an idle mode (404). In some examples, the idle mode comprises no active communication sessions over wireless link 340 or over the 1900 MHz frequency band with BTS 330. In other examples, the idle mode indicates no communications are presently being transferred or received by user device 310. If user device 310 is not in an idle mode, then user device 310 continues to receive wireless access from BTS 330 and continues any active communication sessions over wireless link 340.

If user device 310 is in the idle mode, then user device determines if a battery life threshold has been met (405). The battery life can indicate a remaining battery life of a power source of user device 310, such as a remaining power associated with a battery portion of user device 310. The battery life can also indicate if a battery portion is charging or discharging, with the threshold met if the battery portion is charging. If the battery life threshold has not been met, then user device 310 continues to receive wireless access from BTS 330 and continues any active communication sessions over wireless link 340.

If the battery life threshold has been met, then user device 310 monitors (406) at least signal quality of the 1900 MHz frequency band of sector 330 (BTS 330). The signal quality can include signal strength, signal to noise ratio, signal to interference ratio, energy to interference (E/I) ratio, or other indicator of signal strength or signal quality for communications over the 1900 MHz frequency band of sector 330 as monitored or scanned by user device 310. In many examples, the signal quality can be a signal quality for communications over wireless link 340.

User device 310 drops (407) the 1900 MHz frequency band of sector 330 from the active set based on the $T_{DROP1}$ threshold and neighbor list 380. As discussed above, neighbor list 380 includes entries for various frequency bands for various sectors, which also include associated add/drop thresholds. In operation 407, the $T_{DROP1}$ threshold for entry '1' of neighbor list 380 is applied to communications monitored over wireless link 340. Once the signal quality monitored by user device 310 drops below the $T_{DROP1}$ threshold, then user device 310 can drop the 1900 MHz frequency band of sector 330 from the active set.

User device 310 monitors (408) at least signal quality of the 800 MHz frequency band of sector 330 and the 800 MHz frequency band of sector 333. Other sectors can be monitored or scanned. In this example, wireless link 341 is associated with the 800 MHz frequency band of sector 330, and wireless link 342 is associated with the 800 MHz frequency band of sector 333. User device 310 can monitor or scan for signal quality of communications such as beacon or pilot signals broadcast over the 800 MHz frequency band of each of the sectors associated with BTS 330 and 333.

User device 310 adds (409) ones of the 800 MHz frequency band of sector 330 and the 800 MHz frequency band of sector 333 to the active set based on the $T_{ADD2}$ threshold and the $T_{ADD7}$ thresholds and neighbor list 380. As discussed above, neighbor list 380 includes entries for various frequency bands for various sectors, which also each include associated add/drop thresholds. In operation 409, the $T_{ADD2}$ threshold of entry '2' is applied to communications monitored over the 800 MHz frequency band of sector 330, and the $T_{ADD7}$ threshold of entry '7' is applied to communications monitored over the 800 MHz frequency band of sector 330. Once the signal quality monitored by user device 310 for the 800 MHz frequency band of sector 330 rises above or exceeds the $T_{ADD2}$ threshold, then user device 310 can add the 800 MHz frequency band of sector 330 into the active set. Likewise, once the signal quality monitored by user device 310 for the 800 MHz frequency band of sector 333 rises above or exceeds the $T_{ADD7}$ threshold, then user device 310 can add the 800 MHz frequency band of sector 333 into the active set. One or more of the 800 MHz frequency band of sector 330 and the 800 MHz frequency band of sector 333 can be added to the active set. Once the associated frequency band or bands have been added to the active set, then user device 310 can proceed to communicate over the associated wireless link, such as ones of wireless links 341-342.

User device 310 can also transfer an indication of adding the 800 MHz frequency band of sector 330 or the 800 MHz frequency band of sector 333 into the active set for delivery to a wireless communication system, such as to equipment in a present sector or a present wireless link in a present sector. In further operations, user device 310 can monitor present communications or signal quality of the 800 MHz frequency bands in the active set and drop one or more of these 800 MHz frequency bands from the active set based on the associated the $T_{DROPx}$ thresholds, while adding one or more 1900 MHz frequency bands into the active set based on associated the $T_{ADDx}$ thresholds. In this manner, falling back to or referencing of a preferred roaming list (PRL) can be avoided by user device 310, since different frequency bands and associated add/drop thresholds are provided in neighbor list 380. A PRL can still be referenced for further network access information, such as when roaming access is desired from a roaming or non-native communication network.

Figure 5:
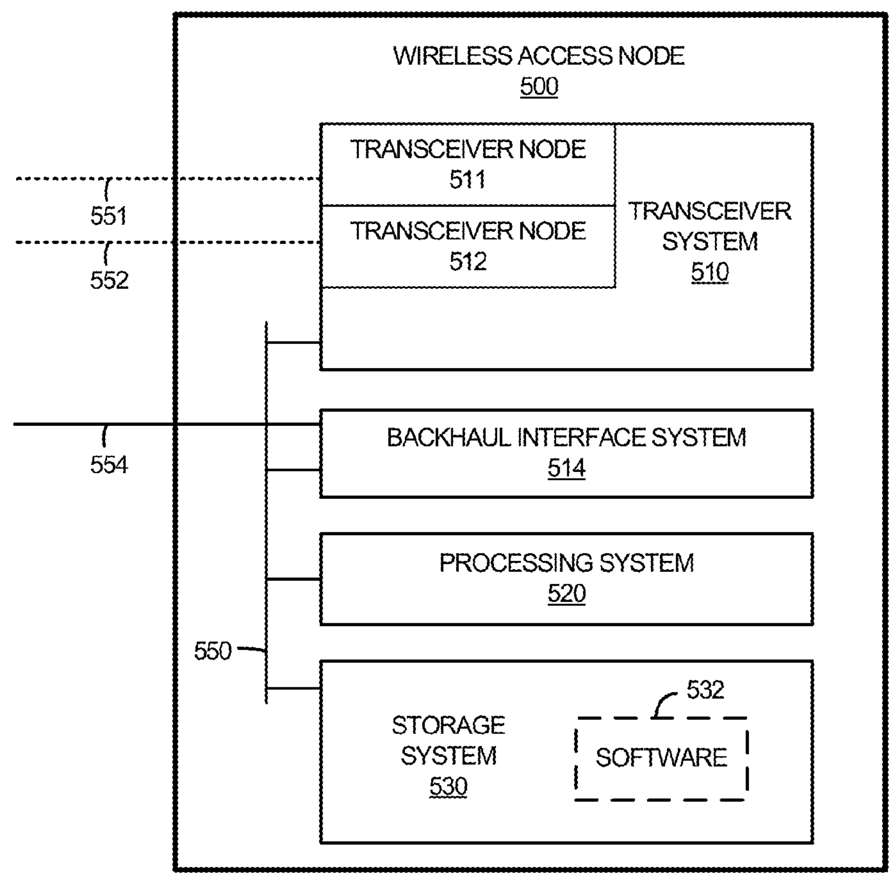
FIG. 5 is a block diagram illustrating a wireless access node.

FIG. 5 is a block diagram illustrating a detailed view of wireless access node 500. Wireless access node 500 can include equipment and systems as discussed herein for wireless access nodes 121-122 in FIG. 1 or base stations 320-321 of FIG. 3, although variations are possible. Wireless access node 500 includes transceiver system 510, transceiver nodes 511-512, backhaul interface system 514, processing system 520, and storage system 530. In operation, processing system 520 is operatively linked to transceiver system 510, backhaul interface system 514, and storage system 530 by bus 550. It should be understood that discrete links can be employed, such as network links or other circuitry. Wireless access node 500 can be distributed or consolidated among equipment or circuitry that together forms the elements of wireless access node 500. Wireless access node 500 can optionally include additional devices, features, or functionality not discussed here for purposes of brevity.

Transceiver system 510 comprises one or more communication interfaces for communicating with wireless communication devices, such as user devices, namely transceiver nodes 511-512. Transceiver system 510 also receives command and control information and instructions from processing system 520 or backhaul interface system 514 for controlling the operations of transceiver nodes 511-512 and user devices over wireless links 551-552, coordinating handoffs of user devices between other wireless access systems, exchanging authentication or authorization information with other wireless communication networks, providing parameters to user devices, transferring neighbor list information, and transferring communications for delivery to user devices. Wireless links 551-552 could use various protocols or communication formats as described herein for wireless links 130-132 in FIG. 1, including combinations, variations, or improvements thereof.

Transceiver nodes 511-512 each include transceiver equipment for wirelessly exchanging user communications and overhead communications with user devices, omitted for clarity, using antenna arrays and the associated wireless links 551-552. Transceiver nodes 511-512 each can comprise one or more antenna elements, RF coupling equipment, structural supports, cabling, or other equipment. In some examples, elements of transceiver nodes 511-512 can comprise a directed antenna array, such as a yagi antenna, dish antenna, parabolic antenna, or phased antenna array to establish beam forming during transmissions to user devices. BTS 330-335 in FIG. 3 can each comprise ones of transceiver nodes 511-512 in some examples.

Backhaul interface system 514 includes a network interface for communicating with one or more communication networks, such as a wireless communication system, among others. The network interface can include a T1 interface, or local or wide area network communication interfaces which can communicate over one or more Ethernet or Internet protocol (IP) links. Examples of backhaul interface system 514 include network interface card equipment, transceivers, modems, and other communication circuitry. In this example, backhaul interface system 514 communicates over link 554. Link 554 could use various protocols or communication formats as described herein for link 133, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data.

In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless access node 500 in general or processing system 520 in particular, direct wireless access node 500 or processing system 520 to exchange communications with wireless communication devices over one or more transceiver nodes, among other operations. Software 532 can include additional processes, programs, or components, such as operating system software, database software, or application software. Software 532 can also comprise firmware or some other form of machine-readable processing instructions executable by processing system 520. In at least one implementation, the program instructions can include first program instructions that direct processing system 520 to exchange communications with wireless communication devices over one or more transceiver nodes, among other operations.

In general, software 532 can, when loaded into processing system 520 and executed, transform processing system 520 overall from a general-purpose computing system into a special-purpose computing system customized to exchange communications with wireless communication devices over one or more transceiver nodes, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 6:
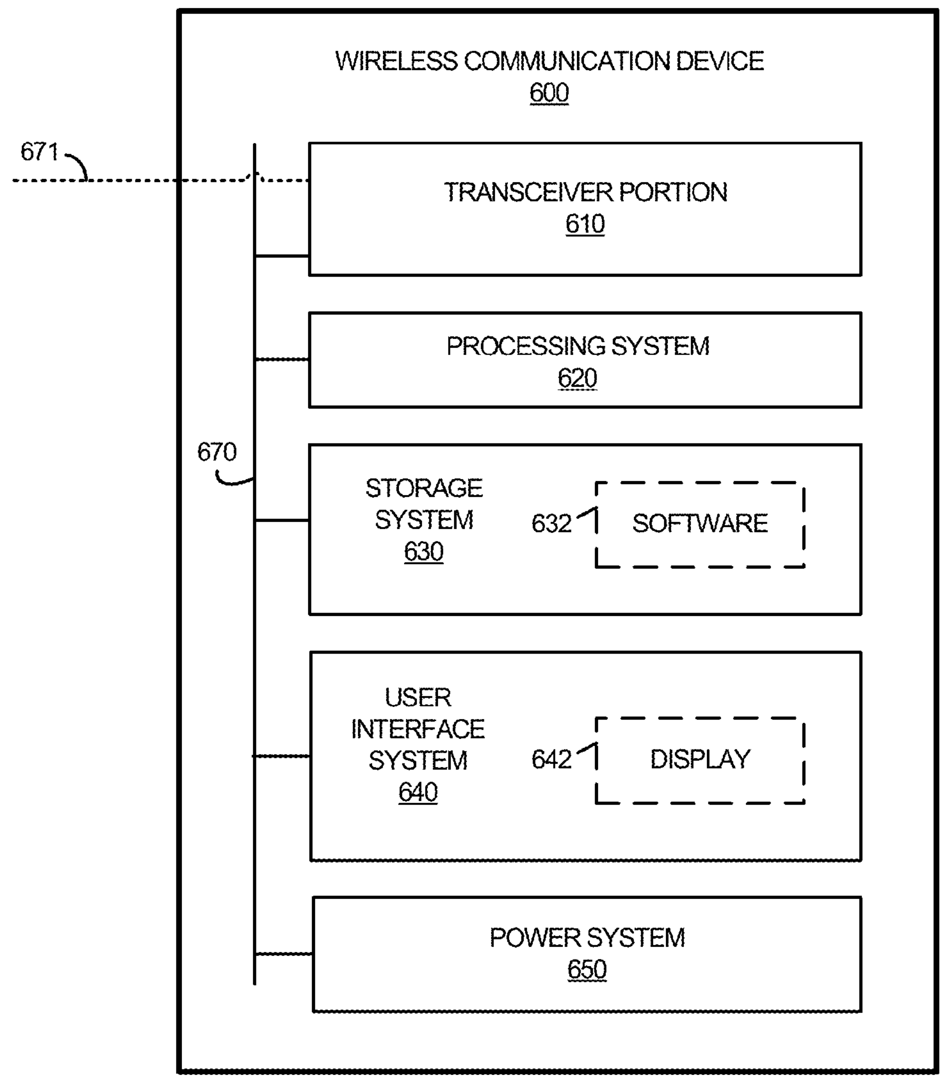
FIG. 6 is a block diagram illustrating a wireless communication device.

FIG. 6 is a block diagram illustrating wireless communication device 600, as an example of wireless communication device 110 found in FIG. 1 or user device 310 found in FIG. 3, although wireless communication device 110 or user device 310 could use other configurations. Wireless communication device 600 includes transceiver system 610, processing system 620, storage system 630, user interface system 640, and power system 650. Transceiver system 610, processing system 620, storage system 630, user interface system 640, and power system 650 are shown to communicate over a common bus 670 for illustrative purposes. It should be understood that discrete links could be employed, such as data links, power links, RF links, or other links. Wireless communication device 600 can be distributed or consolidated among equipment or circuitry that together forms the elements of wireless communication device 600. Wireless communication device 600 can optionally include additional devices, features, or functionality not discussed here for purposes of brevity.

Transceiver system 610 comprises one or more antenna elements and communication interface circuitry for communicating with wireless access nodes of a wireless communication network, such as with base stations of a cellular voice and data network. Transceiver system 610 could include transceiver equipment and antenna elements for wirelessly exchanging user communications and overhead communications over the associated wireless link 671, among further wireless links. Transceiver system 610 also receives command and control information and instructions from processing system 620 or user interface system 640 for controlling the operations of wireless communications over wireless link 671. Wireless link 671 could use various protocols or communication formats as described herein for wireless links 130-132, including combinations, variations, or improvements thereof.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media or storage device readable by processing system 620 and capable of storing software 632. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 632 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 632 can be implemented in program instructions and among other functions can, when executed by wireless communication device 600 in general or processing system 620 in particular, direct wireless communication device 600 or processing system 620 to communicate with wireless communication systems over wireless links, maintain an access list of wireless network information to access wireless communication services, receive a neighbor lists transferred by wireless access nodes, scan frequency bands based on the neighbor lists, and add or drop frequency bands of sectors from the access list based on the add or drop thresholds in the neighbor lists, among other operations. Software 632 can include additional processes, programs, or components, such as operating system software, database software, or application software. Software 632 can also comprise firmware or some other form of machine-readable processing instructions executable by processing system 620.

In at least one implementation, the program instructions can include first program instructions that direct processing system 620 to communicate with wireless communication systems over wireless links, maintain an access list of wireless network information to access wireless communication services, receive a neighbor lists transferred by wireless access nodes, scan frequency bands based on the neighbor lists, and add or drop frequency bands of sectors from the access list based on the add or drop thresholds in the neighbor lists.

In general, software 632 can, when loaded into processing system 620 and executed, transform processing system 620 overall from a general-purpose computing system into a special-purpose computing system customized to communicate with wireless communication systems over wireless links, maintain an access list of wireless network information to access wireless communication services, receive a neighbor lists transferred by wireless access nodes, scan frequency bands based on the neighbor lists, and add or drop frequency bands of sectors from the access list based on the add or drop thresholds in the neighbor lists, among other operations. Encoding software 632 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 632 can transform the physical state of the semiconductor memory when the program is encoded therein. For example, software 632 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 640 includes equipment and circuitry for receiving user input and control, such as for engaging in voice calls or data sessions, and receiving user instructions for text messages or video messages, among other operations. Examples of the equipment and circuitry for receiving user input and control include graphical user interfaces, push buttons, touch screens, selection knobs, dials, switches, actuators, keys, keyboards, pointer devices, microphones, transducers, potentiometers, non-contact sensing circuitry, accelerometers, or other human-interface equipment. User interface system 640 also includes equipment to communicate information to a user of wireless communication device 600. Examples of the equipment to communicate information to the user could include displays, graphical user interfaces, indicator lights, lamps, light-emitting diodes, haptic feedback devices, audible signal transducers, speakers, buzzers, alarms, vibration devices, or other indicator equipment, including combinations thereof.

Power system 650 includes circuitry and a power source to provide power to the elements of wireless communication device 600. The power source could include a battery, solar cell, flywheel, capacitor, thermoelectric generator, chemical power source, dynamo, or other power source. In some examples, power system 650 receives power from an external source, such as a wall outlet or power adapter. Power system 650 also includes circuitry to condition, monitor, and distribute electrical power to the elements of wireless communication device 600.

Bus 670 comprises a physical, logical, or virtual communication link, capable of communicating data, control signals, and communications, along with other information. In this example, bus 670 also includes RF and power distribution elements, such as wires, circuit board traces, or other elements. In some examples, portions of bus 670 are encapsulated within the elements of transceiver system 610, processing system 620, storage system 630, user interface system 640, or power system 650, and can be a software or logical link. In other examples, bus 670 uses various communication media, such as air, space, metal, optical fiber, or some other signal propagation path, including combinations thereof. Bus 670 could be a direct link or might include various equipment, intermediate components, systems, and networks.

Referring back to FIG. 1, wireless communication device 110 can comprise one or more antennas, transceiver circuitry elements, and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless communication system 120 comprises communication and control systems for providing access to communication services for user devices. Wireless communication system 120 can provide communication services including voice calls, text messages, data access, or other communication services provided over cellular or wireless communication networks. In some examples, wireless communication system 120 includes equipment to provide wireless access to communication services within different coverage areas to user devices, route communications between content providers and user devices, and facilitate handoffs between equipment of different coverage areas, among other operations. Wireless communication system 120 can also comprise elements such as radio access network (RAN) equipment, E-UTRAN Node B equipment, eNodeB equipment, Evolved Node B equipment, Mobility Management Entity (MME) equipment, Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Wireless access nodes 121-122 are each associated with wireless communication system 120, and provides wireless links for wireless access to the communication services of wireless communication system 120. Wireless access nodes 121-122 each comprise RF communication and control circuitry, transceivers, and antennas, as well as wireless communications equipment capable of communicating with and providing wireless access within a wireless coverage area to communication services for wireless communication devices, such as wireless communication device 110 in sectors 140-141. The RF communication circuitry typically includes amplifiers, filters, RF modulators, transceivers, and signal processing circuitry. Wireless access nodes 121-122 can also each comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Communication link 133 uses metal, glass, optical, air, space, or some other material as the transport media. Communication link 133 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 133 can be a direct link or can include intermediate networks, systems, or devices, and can include a logical network link transported over multiple physical links.

Wireless links 130-132 can each use the air or space as the transport media. Wireless links 130-132 each comprise one or more wireless communication links provided over an associated wireless frequency spectrum or wireless frequency band, and can use various protocols. Wireless links 130-132 can each comprise a wireless link such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Long Term Evolution (LTE), LTE Advanced, Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for wireless links 130-132 is shown in FIG. 1, it should be understood that wireless link 130-132 are merely illustrative to show communication modes or wireless access pathways for wireless communication device 110. In other examples, further wireless links can be shown, with portions of the further wireless links shared and used for different communication sessions or different content types, among other configurations.

Communication links 130-133 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device that maintains an access list of wireless network information to access wireless communication services, the wireless communication device served by a source wireless access node in a source sector over a first frequency band, wherein the source wireless access node and the source sector also use a second frequency band, and wherein a target wireless access node has a target sector that uses the second frequency band, the method comprising:

in the wireless communication device, receiving a neighbor list transferred by the source wireless access node, the neighbor list indicating a first drop threshold and a first add threshold for the first frequency band of the source sector, a second drop threshold and a second add threshold for the second frequency band of the source sector, and a third drop threshold and a third add threshold for the second frequency band of the target sector, wherein the first drop threshold is lower than the second drop threshold and the third drop threshold, and wherein the first add threshold is higher than the second add threshold and the third add threshold;

in the wireless communication device, scanning the first frequency band of the source sector based on the neighbor list, and in response, dropping the first frequency band of the source sector from the access list based on the first drop threshold; and in the wireless communication device, scanning the second frequency band of the source sector and the second frequency band of the target sector based on the neighbor list, and in response, adding the second frequency band of the source sector and the second frequency band of the target sector to the access list based on the second and third add thresholds.

2. The method of claim 1, further comprising:

monitoring a remaining battery life of the wireless communication device, and when the remaining battery life is above a battery life threshold, then responsively scanning the second frequency band of the source sector and the second frequency band of the target sector based on the neighbor list.

3. The method of claim 1, wherein the first add threshold, the second add threshold, the third add threshold, the first drop threshold, the second drop threshold, and the third drop threshold each comprise an energy to interference (E/I) threshold.

4. The method of claim 1, wherein scanning the first frequency band of the source sector based on the neighbor list comprises scanning the first frequency band when the wireless communication device is in an idle mode of operation, wherein the idle mode comprises no active communication sessions over the first frequency band on the wireless communication device.

5. The method of claim 1, wherein scanning the first frequency band of the source sector based on the neighbor list and scanning the second frequency band of the source sector and the second frequency band of the target sector based on the neighbor list each comprise not referencing a preferred roaming list (PRL) to identify the first frequency band of the source sector, the second frequency band of the source sector and the second frequency band of the target sector.

6. The method of claim 1, wherein the target sector does not provide wireless access over the first frequency band.

7. The method of claim 1, wherein the access list comprises an active set for the wireless communication device.

8. The method of claim 1, wherein the first frequency band comprises a different frequency range than the second frequency band.

9. The method of claim 1, wherein the second drop threshold is lower than the third drop threshold, and wherein the second add threshold is higher than the third add threshold.

10. The method of claim 1, further comprising:

transferring to a wireless communication system associated with the target sector an indication of adding the second frequency band of the source sector and the second frequency band of the target sector to the access list.

11. A wireless communication device, comprising:

a processing portion configured to maintain an access list of wireless network information to access wireless communication services, the wireless communication device served by a source wireless access node in a source sector over a first frequency band, wherein the source wireless access node and the source sector also use a second frequency band, and wherein a target wireless access node has a target sector that uses the second frequency band;

a transceiver portion configured to receive a neighbor list transferred by the source wireless access node, the neighbor list indicating a first drop threshold and a first add threshold for the first frequency band of the source sector, a second drop threshold and a second add threshold for the second frequency band of the source sector, and a third drop threshold and a third add threshold for the second frequency band of the target sector, wherein the first drop threshold is lower than the second drop threshold and the third drop threshold, and wherein the first add threshold is higher than the second add threshold and the third add threshold;

the transceiver portion configured to scan the first frequency band of the source sector based on the neighbor list, and in response, the processing portion is configured to drop the first frequency band of the source sector from the access list based on the first drop threshold; and the transceiver portion configured to scan the second frequency band of the source sector and the second frequency band of the target sector based on the neighbor list, and in response, the processing portion is configured to add the second frequency band of the source sector and the second frequency band of the target sector to the access list based on the second and third add thresholds.

12. The wireless communication device of claim 11, comprising:

the processing portion configured to monitor a remaining battery life of the wireless communication device, and when the remaining battery life is above a battery life threshold, then the transceiver portion is configured to responsively scan the second frequency band of the source sector and the second frequency band of the target sector based on the neighbor list.

13. The wireless communication device of claim 11, wherein the first add threshold, the second add threshold, the third add threshold, the first drop threshold, the second drop threshold, and the third drop threshold each comprise an energy to interference (E/I) threshold.

14. The wireless communication device of claim 11, comprising:

the transceiver portion configured to scan the first frequency band when the wireless communication device is in an idle mode of operation, wherein the idle mode comprises no active communication sessions over the first frequency band on the wireless communication device.

15. The wireless communication device of claim 11, comprising:

the processing portion configured to not reference a preferred roaming list (PRL) to identify the first frequency band of the source sector, the second frequency band of the source sector and the second frequency band of the target sector.

16. The wireless communication device of claim 11, wherein the target sector does not provide wireless access over the first frequency band.

17. The wireless communication device of claim 11, wherein the access list comprises an active set for the wireless communication device.

18. The wireless communication device of claim 11, wherein the first frequency band comprises a different frequency range than the second frequency band.

19. The wireless communication device of claim 11, wherein the second drop threshold is lower than the third drop threshold, and wherein the second add threshold is higher than the third add threshold.

20. The wireless communication device of claim 11, comprising:

the transceiver portion configured to transfer to a wireless communication system associated with the target sector an indication of adding the second frequency band of the source sector and the second frequency band of the target sector to the access list.

* * * * *